United States Patent [19]

Hostetler

[11] Patent Number: 5,185,982
[45] Date of Patent: Feb. 16, 1993

[54] CORNER JOINT FOR MODULAR ASSEMBLIES

[75] Inventor: Vernon Hostetler, Hartville, Ohio

[73] Assignee: Stark Forest Products Inc., Canton, Ohio

[21] Appl. No.: 764,248

[22] Filed: Sep. 23, 1991

[51] Int. Cl.$^5$ ................................................ E04C 3/00
[52] U.S. Cl. ..................................... 52/646; 52/648.1; 403/382; 403/219; 403/217; 446/106; 211/189; 211/74
[58] Field of Search .................. 52/646, 648, 280; 211/189, 74, 105; 403/382, 403, 219, 217, 354, 364; 446/106; 273/160

[56] References Cited

U.S. PATENT DOCUMENTS

| | | | |
|---|---|---|---|
| 3,509,677 | 5/1970 | Krex et al. | 52/646 |
| 3,966,337 | 6/1976 | Crawford | 403/382 |
| 4,825,620 | 5/1989 | Johnson | 52/648 |

Primary Examiner—David A. Scherbel
Assistant Examiner—Wynn E. Wood
Attorney, Agent, or Firm—Paul Bogdon

[57] ABSTRACT

A corner joint for locking in place the upright and horizontal rail members of a modular assembly is disclosed. The rail members are interconnected to form an open frame defining box-like modules for supporting shelving, side wall members, doors, and such like components. The corner joint positively locks the rail members in place and includes similarly shaped forks formed at the end sections of the horizontal rail members and a fork formed at an end section of the upright rail member. The tynes of the forks of the horizontal rail members are provided with slots on the opposite side faces thereof. The tynes of the forks of one horizontal rail member snugly and securely receive in the slots thereof the inside surfaces of a mating fork of another horizontal member. The inside surfaces of the tynes of the upright member are snugly and securely received in the slots of the tynes of the one horizontal rail member. A cross-like connection is formed among the horizontal and upright rail members whereby the receipt of the tynes in the slots result in a positive lock at the corner interconnection.

4 Claims, 3 Drawing Sheets

FIG_2

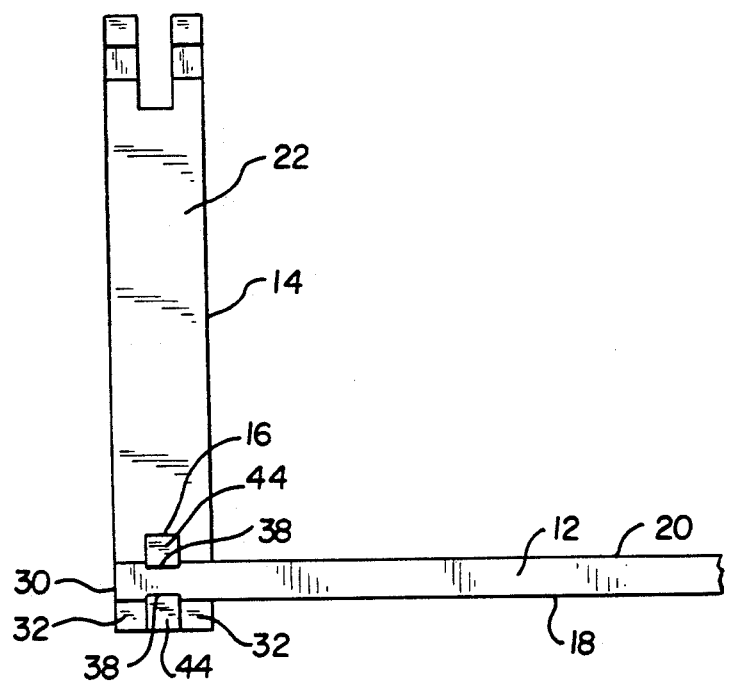
FIG. 3
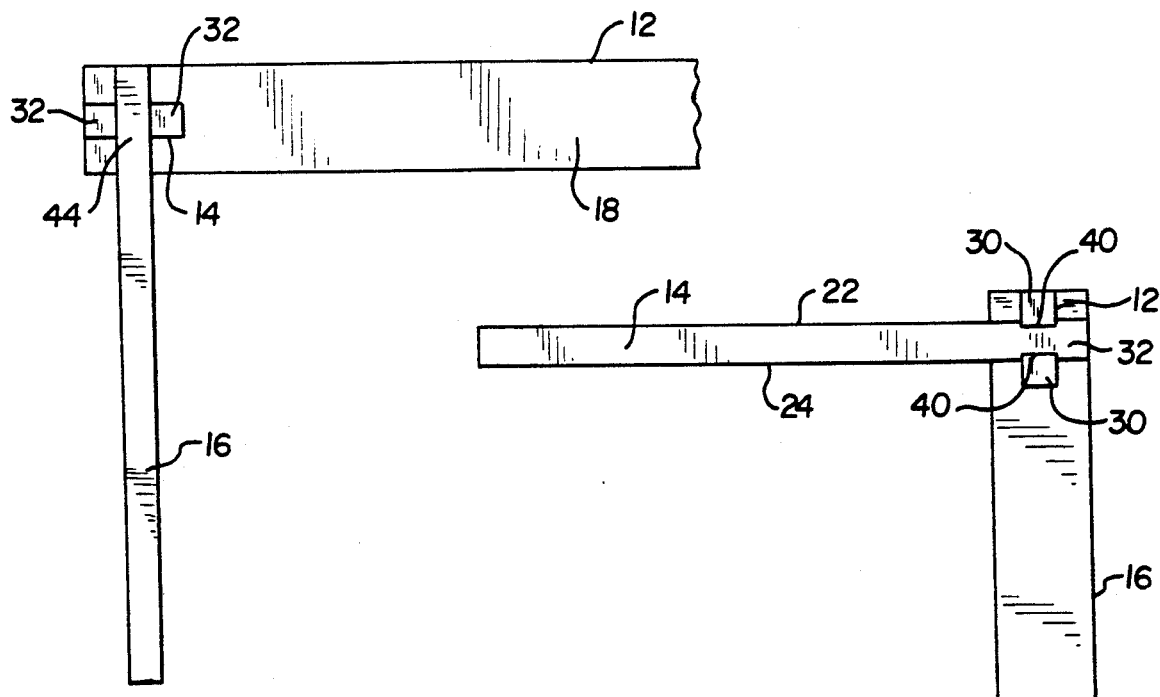
FIG. 4
FIG. 5

CORNER JOINT FOR MODULAR ASSEMBLIES

BACKGROUND OF THE INVENTION

This invention relates to a corner joint for positively locking the corners of horizontal or lateral rail members and upright members forming part of a modular assembly constructed of interconnected horizontal and upright rail members for supporting shelving, side wall members, doors and such like components.

Modular assemblies of the type formed by interconnecting upright rails with horizontal crossbeams or rails are well known. In various designs the rails are provided separately and the user is instructed as to the manner of assembling the rails to form a modular assembly. When formed the modular assembly creates an open frame defining box-like modules for supporting shelving, side walls, doors and other such like components. The modular assembly may be formed in various configurations with the end product having the same function, that is supporting components. The rail members may be interconnected or joined by various constructions. One common construction is that of interconnected forks of varying designs. In some instances the forks are secured by an adhesive or screws, nut and bolts, or the like. Other designs provide wedging elements for securing the joints in place. Where the joints at the rail interconnections are not positively secured by adhesives or other fasteners, there is a tendency for the joints to loosen or come apart when any force is brought to bear on the rails in a direction of separating the joints. The use of wedging elements to provide a positive lock on the interconnecting joints affords satisfactory positive locking but requires the need of additional elements creating an increased expense as well as complicating the overall structure. Virtually all of the heretofore known modular assembly designs are open to becoming disjointed at their corners or require additional elements or adhesives to form positive locks for preventing disjointing of the rail members.

SUMMARY OF THE INVENTION

The present invention overcomes the disjointing and locking problems of the heretofore known modular assembly designs. A positive locking corner joint is provided by this invention which does not require the need of any additional elements for realizing the locking function. Both the lateral or horizontal rail members and the upright rail members are provided with forks at their end sections which when interconnected provide a positive locked end joint. More particularly, the present invention in its preferred form is a corner joint for a modular assembly which includes a plurality of elongated upright and horizontal or lateral rail members of generally rectangular cross-sectional shape interconnected to form an open frame defining box-like modules for supporting shelving, side wall members, doors, and such like components, the locking corner joint formed at the interconnection of the end sections of a first lateral rail member disposed with its side faces in vertical planes at right angles with a second lateral rail member with its side faces in horizontal planes and an upright rail member with its side faces in vertical planes at right angles to both of the first and second lateral side members. The corner joint of this invention comprises: each of the first and second lateral rail members having similarly shaped first forks formed at the end sections thereof; the upright rail member having a second fork formed at an end section thereof and similarly shape to the first forks; each of the first and second forks having two tynes separated by a generally centrally disposed longitudinally extending groove; the tynes of the first forks having laterally extending slots formed intermediate the ends thereof and on both lateral surfaces thereof; and the first and second forks being sized, shaped, constructed and arranged such that when the first and second lateral rail members are interconnected with the upright rail member as set forth, the end sections of the groove side surfaces of the tynes of the first lateral rail member will be snugly and securely received in the respective slots of the tynes of the second lateral rail member, and the end sections of the groove side surfaces of the tynes of the upright rail member will be snugly and securely received in the respective slots of the tynes of the fork of the first lateral rail member. When the corner joint is assembled a cross-like or cruciform joint is formed and with the tynes being snugly received in the slots a positive locking joint is created.

This invention allows the horizontal and upright rail members to be simply joined in the manner required and when so done the corner joint is formed, and applying any force in the direction of disjoining the interconnection will not result in the corner joint coming apart. Accordingly, this invention provides stability, strength, and safety to the assembled modular unit. These results are provided without the need of any additional elements or tools for positively locking the corner joints.

Various other advantages, details and modifications of the present invention will become apparent as the following description of a certain present preferred embodiment proceeds.

BRIEF DESCRIPTION OF THE DRAWINGS

In the accompanying drawings I show a certain present preferred embodiment of my invention which:

FIG. 3 is an enlarged plan view of the rail members of FIG. 2 in interconnected relationship.;

FIG. 4 is a side elevation of the rail members of FIG. 2 in interconnected relationship;

FIG. 5 is another enlarged side elevation view of the rail members of FIG. 2 in interconnected relationship.

DESCRIPTION OF A PREFERRED EMBODIMENT

Figure 1:
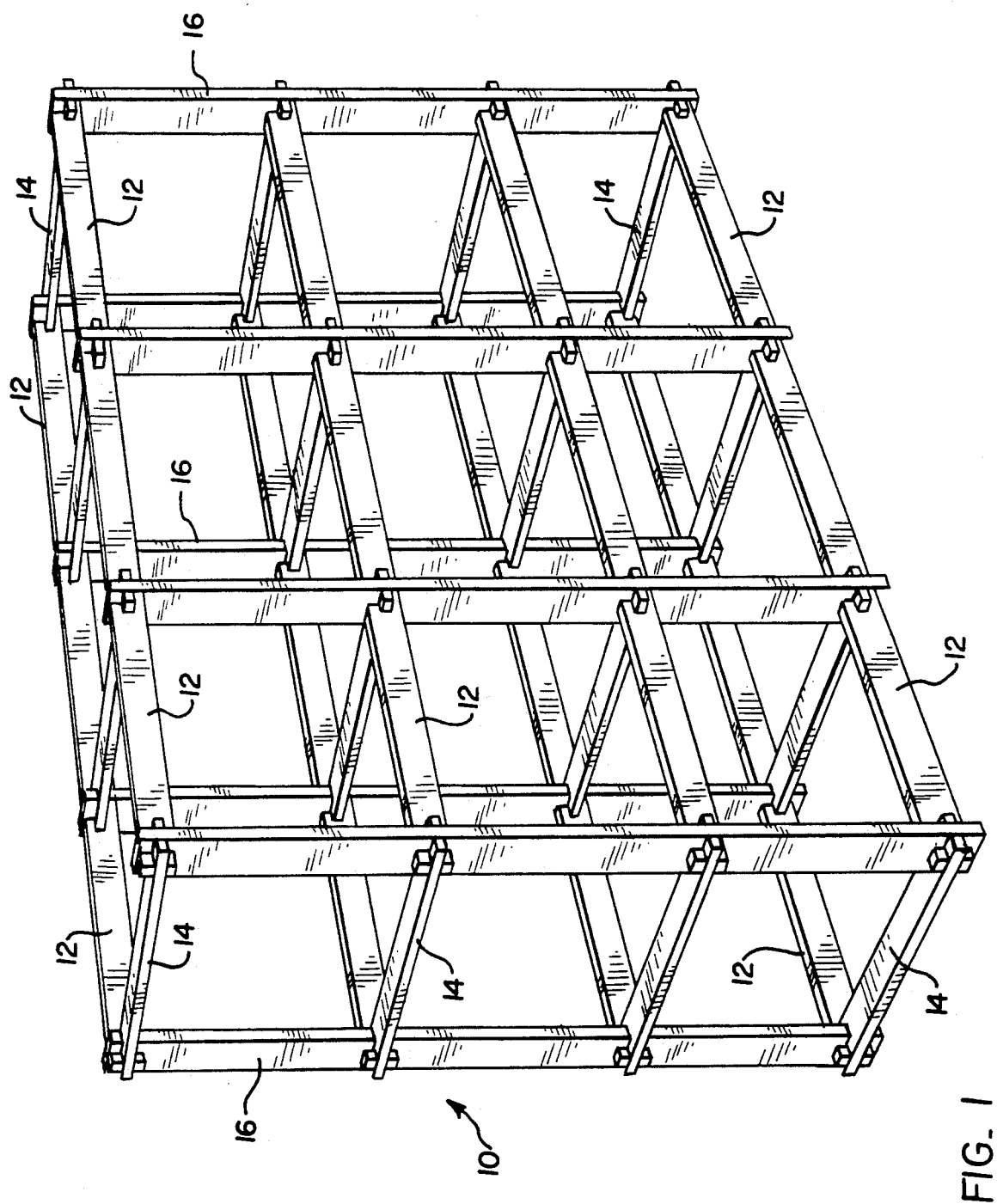
FIG. 1 is a perspective view of a modular assembly of a typical representative form showing the interconnection of horizontal and vertical rail members defining box-like modules for receiving and supporting sich components as shelves, side walls, and doors, embodying corner joints of the present invention.
Figure 2:
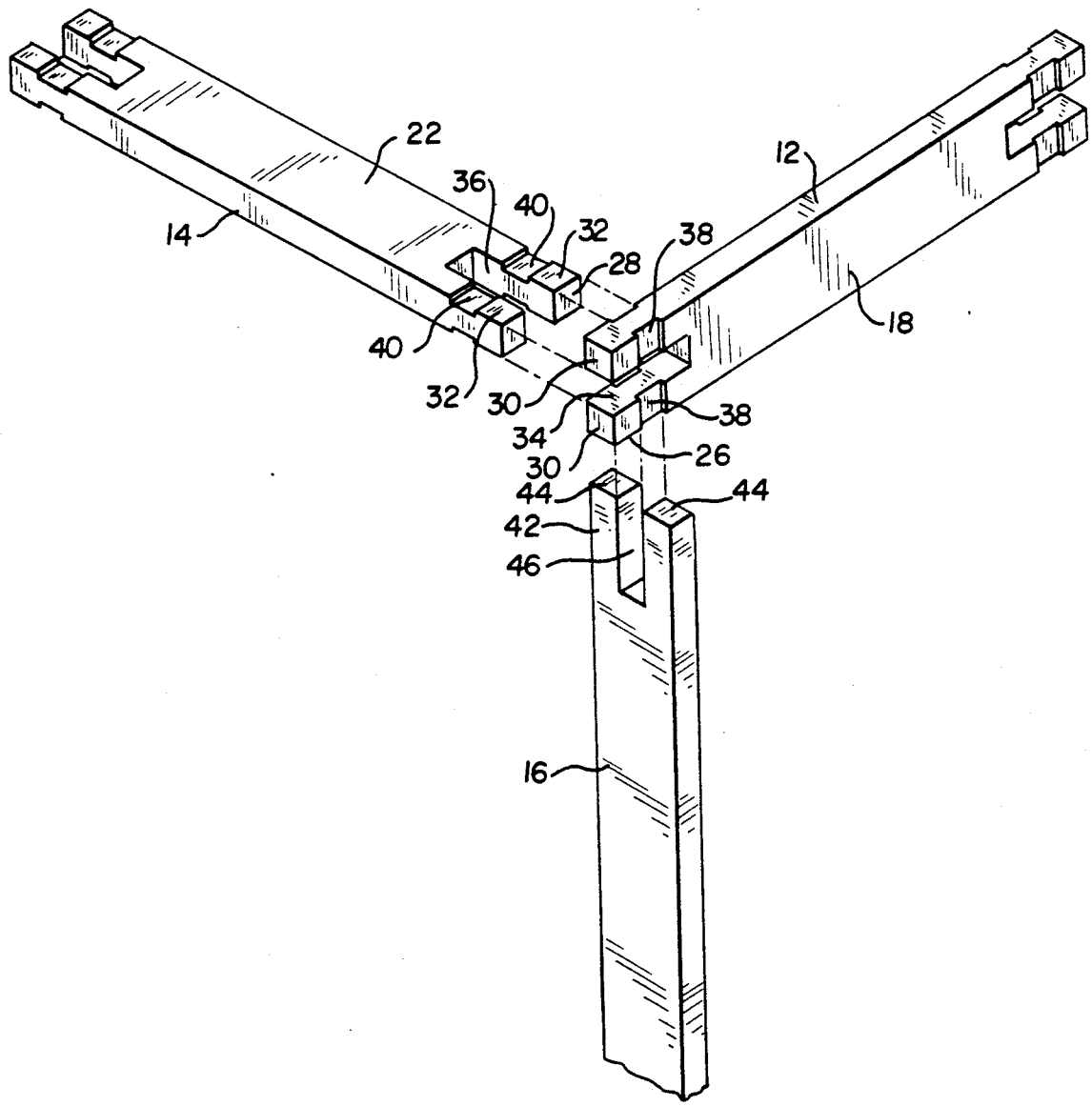
FIG. 2 is an enlarged perspective view of horizontal rail members and upright rail members separated and disposed in horizontal and vertical planes and aligned for interconnection, showing details of the corner joint of the present invention.

Referring now to the drawings 10 generally relates to the modular assembly of FIG. 1 comprised of interconnected horizontal or lateral rail members 12 and 14 with vertical or upright rail members 16 to form an open frame defining box-like modules for supporting shelving, side walls, doors, and such like components. Modular assembly 10 as such is not new in its overall design but rather is well known. The assembly 10 is formed by the user, generally speaking, who is provided with the lateral rail members 12 and 14 and upright rail members 16 together with instructions as to how to assemble the rail members to form varying final assemblies. All of the lateral rail members 12 and 14 and upright rail members 16 are similarly shaped in a rectangular cross-sectional configuration from any suitable material such as kiln dried poplar wood. Other shapes and materials could be used as anyone skilled in this art would readily recognize.

The four corners of modular assembly 10 are joined in accordance with the present invention to form positive locked joints which will not become separated whenever any reasonable force is applied in a direction of disjoining. FIGS. 2-5 illustrate one of the corner joints of this invention. As shown in those figures a lateral rail 12 is joined with another lateral rail 14 and interconnected with an upright rail 16. In the figures lateral rail 12 will be identified as a first lateral rail and as shown it has its side faces 18 and 20 in parallel vertical planes. The similarly shaped horizontal rail 14 is identified as the second lateral rail and has its side faces 22 and 24 in horizontal planes. Lateral rail member 12 is provided with a fork 26 at its end section. Similarly, lateral rail 14 is provided with a fork 28 of substantially the same size and shape as that of fork 26 of lateral rail 12. Thus, lateral rails 12 and 14 with their respective forks 26 and 28 may have precisely the same size and shape. It should be noted at this juncture that the lateral rails 12 and 14 may be provided with differing features as for example slots for the interconnection at a midsection of the various rails forming the overall modular assembly 10. For purposes of the corner joint of the present invention the end sections where the forks 26 and 28 of lateral rail members 12 and 14 are formed are for all intents and purposes similarly constructed. Forks 26 and 28 each have a pair of similarly sized and shaped tynes 30 and 32 respectively. The tynes 30 and 32 are separated by generally, centrally disposed longitudinally extending grooves 34 and 36. Aligned slots 38 are formed intermediate to the ends of tynes 30 on both of the side faces of those tynes. Similarly, slots 40 are formed on the tynes 32 of fork 28. As stated, the overall construction of forks 26 and 28 of lateral rail members 12 and 14 are generally the same.

Upright rail member 16 is provided with a fork 42 at its end section where the upright rail member will be interconnected with the lateral rail members 12 and 14. The fork 42 of upright rail member 16 is the same in all features as the forks 26 and 28 of lateral rail members 12 and 14 except that fork 42 is not provided with any laterally extending slots. Thus, fork 42 has two tynes 44 separated by a generally, centrally disposed longitudinally extending groove 46.

By providing the forms of the forks 26 and 28 of lateral rail members 12 and 14 and the fork 42 of upright rail member 16 a simple interconnection of those rail members is enabled. The first lateral rail member 12 has its fork 26 joined to the fork 28 of second lateral rail member 14 such that the groove-side surfaces of the tynes 30 snugly and securely slide into and are received in the slots 38 of the tynes 32 of fork 28 of the second lateral rail member 14. After the first lateral rail member 12 is joined to the second lateral rail member 14 as described, the upright rail member 16 is joined to both of those lateral rail members with the fork 42 of upright rail member 16 being mated with the forks 26 and 28 of the lateral rail members 12 and 14 such that the groove-side surfaces of the tynes 44 slide into and are snugly and securely received by the slots 40 of tynes 32 of the fork 28 of the second lateral rail member 14. The interconnection of forks 26 and 28 with fork 42 of the respective lateral rail members 12 and 14 and upright rail member 16 provides a positive locked end joint. No special tools or additional components are needed for providing the positively locked end joint.

From the foregoing description it should be obvious that the lateral rail member 12 has its side faces at right angles to the side faces of lateral rail 14. Upright rail member 16 has its side faces at right angles to both the side faces of the lateral rails 12 and 14. It should also be clear and obvious that when the corner joints are formed that they realize a cross-shaped or cruciform configuration. It should be apparent at this juncture that the positive lock feature of the corner joint of this invention is achieved simply and inexpensively. The slots 30 and 32 of the forks 26 and 28 of the lateral rail members 12 and 14 may be simply formed by dado operations and without the need of any elaborate manufacturing steps.

While I have shown and described a present preferred embodiment of this invention, it is to be distinctly understood that the invention is not limited thereto, but may be otherwise embodied within the scope of the following claims.

I claim:

1. In a modular assembly which includes a plurality of elongated upright and lateral rail members of generally rectangular cross-sectional shape interconnected to form an open frame defining box-like modules for supporting shelving, side wall members, doors and such like components, a locking corner joint formed at the interconnection of the end sections of the first lateral rail member disposed within its side faces in vertical planes at right angles with a second lateral rail member with its side faces in horizontal planes, and an upright rail member with its side faces in vertical planes at right angles to both of said first and second lateral rail members, the improvement therewith in the locking corner joint compromising;

each of said first and second lateral rail members having similarly shaped first forks formed at the end sections thereof;

said upright rail member having a second fork formed at an end section thereof and similarly shaped as the said first fork;

each of said first and second forks having two tynes separated by a generally, centrally disposed longitudinally extending groove;

said tynes of said first and second forks having laterally extending slots formed intermediate the ends thereof and on both lateral surfaces thereof; and said first and second forks being sized, shaped, constructed and arranged such that when said first and second lateral rail members are interconnected with said upright member as set forth herein the end sections of the groove side surfaces of the tynes of said first lateral rail member will be snugly and securely received in the respective slots of the tynes of said second lateral rail member and the end sections of the groove side surfaces of the tynes of said upright rail member will be snugly and securely received in the respective slots of the tynes of the fork of said first lateral member.

2. The corner joint as set forth in claim 1 wherein said slots of the tynes of said first and second lateral rail members are formed midway of the ends of said tynes.

3. The corner joint as set forth in claim 1 wherein said first and second forks have substantially the same shape and size.

4. The corner joint as set forth in claim 1 wherein the side faces of the tynes of both first and second forks are coplanar with the side faces of said lateral rail members and said upright members, respectively.

* * * * *